Patented Sept. 1, 1942

2,294,433

UNITED STATES PATENT OFFICE 2,294,433

HYDROXY KETONES OF THE CYCLOPENTANOPOLYHYDROPHENANTHRENE SERIES AND METHOD OF PRODUCING THE SAME

Ulrich Westphal, Berlin-Zehlendorf, Arthur Serini, Berlin, and Heinrich Köster, Berlin-Charlottenburg, Germany, assignors to Schering Corporation, Bloomfield, N. J., a corporation of New Jersey No Drawing. Application October 5, 1938, Serial No. 233,346. In Germany October 5, 1937

11 Claims. (Cl. 260—397.4)

This invention relates to a process for the conversion of diketones of the cyclopentanopolyhydrophenanthrene series into the corresponding hydroxy ketones.

The process of the invention consists in that the diketones serving as starting materials are first converted by interaction with suitable compounds into mono derivatives and the mono derivatives obtained, in which therefore only one keto group is converted, are subjected to the action of hydrogenating agents. By reformation of the keto group from the hydroxy ketone derivatives produced there is then obtained the corresponding free hydroxy ketone.

As starting materials come into question the saturated and unsaturated diketones of the cyclopentano-polyhydrophenanthrene series, as for example the androstandiones, and androstendiones. Of particular value is the process for the manufacture of testosterone from androstendione, since this is the first hitherto known process by which it is possible by purely chemical methods to proceed directly from androstendione to testosterone. For the conversion of the diketones into the mono derivatives there are suitable for example the so-called ketone reagents, that is to say the customary substances which are capable of converting ketones into derivatives from which by hydrolysis the free ketone group can be reformed, as for example semi-carbazide, phenylhydrazine and its substitution products, as for example nitrophenylhydrazine, hydroxylamine and the like. The reagents mentioned herein above have the common property of forming condensation products with ketones thereby splitting off water, such condensation products being capable of being split subsequently to liberate the free ketones. They are described for instance in Houben "Methoden der Organischen Chemie," 3.Auflage, 2.Bd. S.572–577.

Another method for converting the diketones into their mono derivatives consists for instance in treating the former with acetalising agents or agents capable of forming enol ethers.

As acetalising agents have proved particularly suitable ortho formic acid esters. Very good results are likewise obtained by reaction with other acetals, for example acetone-diethylacetal, in the case of which in the presence of catalysts a reacetalisation takes place.

By this means it has been shown in a surprising manner that the action of such agents on androstandiones or androstendiones preferentially leads to the formation of the 3-mono derivatives.

The said derivatives are distinguished by a particularly good crystallisation capacity and can be produced in a pure state without difficulty. The relatively small amount of other reaction products are by hydrolysis with acids again split up to androstendione whereby a quantitative conversion of the androstendione into the 3-mono derivative is rendered possible.

By using androstandione-3,17 as starting material for the present process primarily 3-acetals are obtained that can be converted into the 3-enol ethers, for instance by heating; androstendione-3,17 on the other hand yields by subjecting the same to said acetalizing agents chiefly the 3-enol ether.

In order to produce from these mono derivatives hydrogenation products wherein the keto group remaining free is reduced to the hydroxy group, the mono derivatives are subjected to the action of reducing agents which leave the converted keto group essentially unattacked. As particularly suitable has proved, for example, the reduction with sodium in alcohol; however, other known processes can be employed likewise. Thus, for example, the reduction can be carried out according to the process of Meerwein and Ponndorf with alcohols in the presence of aluminium or magnesium alcoholates.

In order to obtain from these reaction products the corresponding hydroxy ketones said products, preferably without further purification, are split up hydrolytically, preferably with acid, for example, hydrochloric acid, sulphuric acid and the like, advantageously in alcoholic solution. Especially good yields are obtained when using the method of subjecting the diketones to the action of acetalising reagents.

If necessary the hydrolysation product can be purified in a customary manner, for instance by recrystallisation, distillation in a high vacuum, subjecting to the action of specific ketone reagents, especially of the so-called Girard reagent (trimethyl-ammonium acetic acid hydrazide hydro-chloride) or the like.

The following examples serve to illustrate the invention without, however, limiting the same to them.

*Example 1*

2.86 gms. of $\Delta^{4,5}$-androstendione-3,17 are dissolved in 10 ccs. of benzene and then 5 gms. of ethyl orthoformate and 1.4 gms. of absolute ethyl alcohol are introduced. Finally 10 drops of an 8.4% absolute alcoholic hydrochloric acid are dropped in. Thereupon the whole is heated for two hours to 50° C. The reaction product is then rendered distinctly alkaline with methyl alcoholic sodium hydroxide solution, poured into water and extracted with ether. The ethereal solution is washed neutral, dried and evaporated. The evaporation residue crystallises on grinding with ethyl alcohol containing a little pyridine. 2.56 gms. of 3-ethyl-enol-ether of $\Delta^{4.5}$-androstendione-3,17 are isolated of M. P. 152° C.; $[\alpha]^{20}_D = -89.3°$ (CHCl$_3$). The mother liquor after the addition of a little 2N aqueous hydrochloric acid is heated for 20 minutes on the water bath. Then the whole is treated with water and extracted with ether. On evaporation of the ethereal solutions after washing neutral and drying, 0.49 gms. of $\Delta^{4.5}$-androstendione is recovered of M. P. 171° C.; $[\alpha]^{20}_D = +193.9°$ (CHCl$_3$). The yield of the enol ether from reacted $\Delta^{4.5}$-androstendione thus amounts to 98.7%.

2.0 gms. of 3-ethyl-enol-ether of androstendione M. P. 152° C. are dissolved in n-propyl-alcohol which has been distilled over metallic magnesium. Into this solution heated to 100° C. 2.0 gms. of metallic sodium are added in small portions. The heating is continued until the sodium is completely dissolved. Thereupon the reaction solution is poured into water whereby the testosterone-enol-ether separates quantitatively in beautiful leaflets. The product is filtered, washed neutral with water, dissolved, while still moist, in ethyl alcohol, treated with some 2N hydrochloric acid and heated on the water bath for 20 minutes. Thereupon the reaction solution is again poured into water and extracted with ether. The neutral washed and dried ethereal solution leaves after evaporation in quantitative yield testosterone of M. P. 150° C. and rotation $[\alpha]^{20}_D = +107.5°$ (C$_2$H$_5$OH), which by crystallisation once from hexane can be completely purified.

*Example 2*

2.86 gms. of androstendione are dissolved in 20 ccs. of benzene, 4.0 gms. of acetone diethylacetal B. P. 114° C. introduced and 10 drops of 8.4% absolute alcoholic hydrochloric acid added thereto. The acetone which is liberated during the reaction which is conducted for 2 hours at 75° C., can be separated by distillation and identified. The working up takes place after previous addition of alcoholic sodium hydroxide solution as described in Example 1. The isolated crystals yield, by recrystallisation once from alcohol containing pyridine, pure androstendione enol ether; M. P. 152° C.; $[\alpha]^{20}_D = -89.2°$ (CHCl$_3$). From the crystallisation mother liquors by simple acid treatment the androstendione can be recovered pure and in practically quantitative yield, so that the yield of 3-enol-ether of androstendione-3,17 calculated on reacted androstendione is practically quantitative.

2.0 gms. of enol-ether of androstendione-3,17, M. P. 152° C., are dissolved in the hot in 20.0 ccs. of absolutely anhydrous isopropyl alcohol. Then 2.0 gms. of powdered aluminium isopropylate are introduced. Thereupon in a distillation apparatus protected from atmospheric moisture, from the above reaction mixture the acetone produced is distilled off together with isopropyl alcohol. Through a dropping funnel again anhydrous isopropyl alcohol is added and the alcohol distilling off continuously replaced. In the distillate the acetone is determined by interaction with hydroxylamine hydrochloride and titration of the hydrochloric acid thereby liberated. After a reaction duration of 4½ hours 94.9% of the theoretical quantity of acetone can be detected, after a further 2 hours the reaction is practically complete (97.9% yield of acetone).

The reaction product is thereupon treated with 20 ccs. of 2N hydrochloric acid and heated to boiling for half an hour.

Finally the whole is treated with water and extracted with ether. The ethereal solution is washed neutral, dried and evaporated. On evaporation crystallisation takes place. The crude product obtained is freed, by crystallisation from ethyl alcohol, from 17-cis-testosterone likewise produced and yields pure 17-trans-testosterone of M. P. 153° C.; $[\alpha]^{20}_D = +109.2°$ (C$_2$H$_5$OH). The cis-testosterone produced as secondary product is oxidised in known manner (compare Helv. Chim. acta vol. 19, page 842) to androstendione which is again subjected to the above mentioned reaction. Thus, an almost quantitative conversion of androstendione into 17-trans-testosterone, the highly active male sex hormone, is possible.

*Example 3*

2.86 gms. of androstendione-3,17 are dissolved in 10 ccs. of benzene and after addition of 40 ccs. of absolute alcohol treated, with cooling with an ice-common salt freezing mixture, with 1.37 gms. of the hydrochloride of formimido-ether. After 2 days standing at room temperature crystals of the ammonium chloride formed have separated in the reaction mixture. Then water containing a little ammonia is added and the whole extracted with ether. The washed and dried ethereal solution on evaporation in vacuum leaves as residue a yellowish oil which on grinding with alcohol crystallises. The crude product obtained is crystallised from alcohol containing pyridine and yields 3-ethyl-enol-ether of androstendione-3,17 of M. P. 152° C.; $[\alpha]^{20} = -89°$ (dioxane). This product can be converted into testosterone according to the methods described in Example 1 and 2.

*Example 4*

1.44 gms. of androstandione (M. P. 132° C.; $[\alpha]^{20}_D = +113.6°$ in chloroform) are dissolved in 10 ccs. of benzene to which solution 2 gms. of ortho formic acid ethyl ester, 1.4 gms. of absolute alcohol and 10 drops of an 8.4% absolute alcoholic hydrochloric acid are added. The solution is heated for 1 hour to 75° C. The reaction product is then rendered alkaline with methyl alcoholic sodium hydroxide solution, poured into water and extracted with ether. The ethereal solution is washed with water, dried and evaporated. The crystalline residue is recrystallized from alcohol containing pyridine and yields the androstandione acetalised in the 3-position of M. P. 123° C. and rotation $[\alpha]_D = +82°$ (chloroform).

1 gm. of the acetal is dissolved in pure n-propylalcohol and heated to 100° C. During the heating 2 gms. of sodium are introduced. The heating is continued until all the sodium is dissolved. After cooling the reduction product is poured into water and taken up in ether. The ethereal solution is washed with water and evaporated. The residue is heated with aqueous alcoholic hydrochloric acid for 15 minutes on the water bath. By pouring into water, extraction with ether, washing, drying and evaporation of the ether there is obtained as crystalline residue the dihydro-testosterone which is purified by crystallisation from

Example 5

To a solution of 1 gm. of androstendione of M. P. 169° C. in 50 ccs. of ethanol is added in the cold the quantity of semicarbazide acetate (produced from 386 mg. of semicarbazide hydrochloride and 285 mg. of anhydrous sodium acetate in a little water) corresponding to 1 mol. After gently boiling for half an hour, hot water (about 100 ccs.) is added to the commencement of turbidity and the whole left over night in an ice chest. 1.02 gms. of mono-semicarbazone of decomposition point 234° C. separate; after recrystallisation several times from dilute and pure alcohol it forms either individual clusters of fine crystal needles or heavy, strongly refracting spherical crystals having regular surfaces, which melt uniformly at 245° C. with decomposition. The monosemicarbazone is to a small extent soluble in chloroform, glacial acetic acid, pyridine and piperidine; in the hot also in ethyl, isopropyl and amyl alcohol and also in dioxane. It is very difficultly soluble or insoluble in ether, benzene ethyl acetate, butanol, cyclohexane, ethyl malonate and methyl benzoate.

300 mg. of monosemicarbazone of M. P. 245° C. are dissolved in 75 ccs. of absolute isopropanol and treated at boiling point during 25 minutes with sodium almost to the point of saturation. The hot mixture is rapidly poured out, freed from residual sodium, the solidified crystal mass dissolved in water and with cooling neutralised with dilute sulphuric acid to a weak alkaline reaction. The reaction product is carefully extracted with ether or chloroform and obtained crystalline from dilute alcohol. Yield 245 mg. of M. P. 160–185° C. In a corresponding manner the reduction also takes place with sodium in ethanol.

245 mg. of the reduction product melting at 160–185° C. are boiled for half an hour in a mixture of 20 ccs. of alcohol and 10 ccs. of 2N aqueous sulphuric acid. After customary working up by extraction with ether the product is dissolved in a little ethyl acetate and sprayed with low boiling petrol ether. 24 mg. crystallise in beautiful colourless clusters, which after recrystallisation from ethyl acetate, petrol ether, ethyl acetate-hexane and dilute alcohol melt at 154–156° C. The optical rotation of this mixed crystallisate amounts to $[\alpha]^{20}_D = +79.2°$ (in alcohol); under the assumption that it consists of testosterone ($[\alpha]_D = +104°$) and androstendiol ($[\alpha]_D = -55.5°$) there can be calculated a testosterone content of about 85%. The mixed melting point of this crystallisate with pure testosterone exhibits no depression.

44 mg. of the mixed crystallisate in 1 cc. of alcohol are combined with a solution of about 50 mg. of the chloride of trimethyl ammonium acetic acid hydrozide in 4 ccs. of alcohol and after the addition of 0.5 cc. of glacial acetic acid maintained for half an hour at gentle boiling. The reaction solution is poured into water in which for approximate neutralisation of the acetic acid 420 mg. of $Na_2CO_3$ are dissolved. After the removal of the ketone-free portion by extraction with ether, the aqueous solution is acidified with dilute sulphuric acid; it becomes turbid and after 5 hours, standing at room temperature is extracted with ether. Pure testosterone is obtained which after recrystallisation from dilute alcohol melts at 153–154° C.

Example 6

1.44 gms. of androstandione-3,17 are dissolved in 10 cc. of benzene. To this solution there are added 0.85 gm. of ortho-formic acid ethyl ester, 0.7 gm. of absolute alcohol and 5 drops of 8% alcoholic hydrochloric acid. After heating for 1 hour to 75° C. the reaction mixture is worked up as described in Example 1 and the crystalline product obtained is recrystallised from alcohol containing pyridine. The androstandione-3,17-diethyl-acetal-3 obtained thereby has a melting point of 121–123° C.; $[\alpha]^{20}_D = +75.6°$ (dioxane).

Into a mixture of 100 mg. of this product in 5 ccs. of n-propyl-alcohol there are introduced at 100° C. 200 mg. of sodium. After dissolution of the sodium the reaction mixture is diluted with water and extracted with ether. The ethereal solution is washed until neutral reaction, dried and evaporated. The residue is taken up in alcohol and the alcoholic solution is heated with dilute hydrochloric acid for 15 minutes on the water bath. Thereupon it is diluted with water, the aqueous solution extracted with ether and the ethereal extract washed, dried and evaporated to dryness. The residue yields on recrystallisation from acetic acid ethyl-ester dihydro testosterone, M. P. 176–177° C.; $[\alpha]^{20}_D = +32°$ (alcohol).

Example 7

A solution of 500 mg. of 3-diethyl-acetal of androstondione-3,17 obtained according to Example 6 in xylene is heated for 2 hours to boiling. After evaporation of the xylene in a vacuum the residue is crystallised from alcohol containing pyridine. Thereby the androstandione-3,17-enol-ether with the melting point of 105–106° C. is obtained; $[\alpha]^{20}_D = +120°$.

On reducing this enol-ether in the same manner as described in Example 6 for 3-diethyl-acetal androstandione-3,17 and further working up the reaction mixture dihydro-testosterone is obtained.

Example 8

2.86 gms. of androstendione-3,17 are dissolved in 10 ccs. of benzene to which solution 1.7 gms. of ortho-formic-acid-ethyl-ester, 1.4 gms. of absolute alcohol and 10 drops of about 8% alcoholic hydrochloric acid are added. After heating for 2 hours to 75° the acetalisation mixture is worked up as described in the previous examples and the crystalline product obtained is purified by recrystallisation from alcohol containing pyridine. The 3-ethyl-enol-ether of androstendione-3,17 crystallises in leaflets of the M. P. 152° C.; $[\alpha]^{20}_D = -89°$ (dioxane).

A solution of 2.0 gms. of 3-enol-ether of androstendione-3,17 and 40 ccs. of n-propyl-alcohol is heated to 100° C. Thereupon 2.0 gms. of sodium are added to this solution in small portions within 45 minutes. After the sodium has dissolved the reaction solution is diluted with water whereupon the testosterone-enol-ethyl-ether separates in well defined crystals. The crystals are washed in water and dried, M. P. 118–122° C.

The crude crystals are dissolved in ethanol and the solution is heated with dilute hydrochloric acid. Thereupon the reaction mixture is mixed with water, extracted with ether and the ethereal solution is evaporated after washing and drying. The crystalline residue shows a melting point of 149° C.; $[\alpha]^{20}_D = +107.5°$ ($C_2H_5.OH$) and represents testosterone.

*Example 9*

2.86 gms. of androstendione-3,17 are dissolved in 20 ccs. of benzene, whereupon 1.89 gms. of acetone-diethyl-acetal and 10 drops of 8% absolute alcoholic hydrochloric acid are added. The reaction mixture is heated for 3 hours in a distillation apparatus to 75° C. whereby acetone distils off. After adding alcoholic sodium hydroxide solution the mixture is diluted with water, taken up in ether and the ethereal solution is washed, dried and evaporated. On recrystallisation from alcohol, containing pyridine, 3-ethyl-enol-ether of androstendione-3,17 of the melting point 150° C. and the rotation $[\alpha]^{20}_D = -89°$ is obtained besides unreacted androstendione-3,17.

The conversion of this enol-ether into testosterone is carried out in the same manner as described in Example 8.

Of course, many changes and variations in the reaction conditions, the acetalising agents or the agents capable of forming enol-ethers, the solvents used, the reaction temperatures employed and so forth may be made in accordance with the principles set forth herein and in the claims annexed hereto.

Having now particularly described and ascertained in the nature of our said invention and in what manner the same is to be performed, we declare that what we claim is:

1. Process for the manufacture of 3-mono-enol ethers of androstandione comprising heating 3-mono-acetals of androstandione until the 3-mono-enol-ether is formed.

2. Process for the manufacture of testosterone comprising reacting androstendione with an acetalising agent, converting the free carbonyl group in the 17-position of the 3-mono-enol ethers thereby formed by reduction into an alcohol group, and hydrolyzing the reduction product to testosterone.

3. 3-acetals of diketo compounds of the 10,13-dimethyl cyclopentonapolyhydrophenanthrene series.

4. 3-enol ethers of diketo compounds of the 10,13-dimethyl cyclopentanopolyhydrophenanthrene series.

5. 3-ethyl-enol ether of $\Delta^{4,5}$-androstendione-3,17 having a M. P. of 152° C. and a rotation of $[\alpha]^{20}_D = -89.3$ (CHCl₃).

6. 3-diethyl-acetal of androstandione-3,17 having a M. P. of 121-123° C. and a rotation of $[\alpha]^{20}_D = +75.6$ (dioxane).

7. 3-ethyl-enol ether of $\Delta^{4,5}$-androstenon-3-ol-17 having a M. P. of 118-122° C.

8. 3-enol ethers of 3-keto-17-hydroxy compounds of the 10,13-dimethyl cyclopentanopolyhydrophenanthrene series.

9. Process for the manufacture of 3-mono-enol-ethers of androstandione comprising reacting androstandione with an acetalizing agent to form the 3-acetal of androstandione, the 17-keto group remaining free, and heating such compound until the 3-mono-enol-ether is formed.

10. Process which comprises heating androstandione with an acetalizing agent to form the acetal only at the 3-keto group, and subsequently reducing the 17-keto group to an alcohol group.

11. Process for the manufacture of 3-mono-enol-ethers of androstendione, comprising reacting androstendione with an acetalizing agent to form the 3-acetal of androstendione, the 17-keto group remaining free, and heating such compound until the 3-mono-enol-ether is formed.

ULRICH WESTPHAL.
ARTHUR SERINI.
HEINRICH KÖSTER.